(12) United States Patent
Feng et al.

(10) Patent No.: US 11,019,240 B2
(45) Date of Patent: May 25, 2021

(54) FIXING RING, LENS MODULE, AND ELECTRONIC DEVICE INCLUDING THE SAME

(71) Applicant: HON HAI PRECISION INDUSTRY CO., LTD., New Taipei (TW)

(72) Inventors: Ya-Lan Feng, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/533,908

(22) Filed: Aug. 7, 2019

(65) Prior Publication Data

US 2020/0169652 A1 May 28, 2020

(30) Foreign Application Priority Data

Nov. 27, 2018 (CN) .......................... 201811428262.2

(51) Int. Cl.
*H04N 5/225* (2006.01)
*G03B 17/12* (2021.01)
*G02B 7/02* (2021.01)

(52) U.S. Cl.
CPC .......... *H04N 5/2254* (2013.01); *G02B 7/026* (2013.01); *G03B 17/12* (2013.01); *H04N 2201/02416* (2013.01)

(58) Field of Classification Search
None
See application file for complete search history.

(56) References Cited

U.S. PATENT DOCUMENTS

| | | | | |
|---|---|---|---|---|
| 2011/0116177 A1* | 5/2011 | Lin | ........................ | G02B 5/005 359/738 |
| 2012/0162795 A1* | 6/2012 | Yoshimura | ........... | G02B 13/004 359/830 |
| 2013/0021681 A1* | 1/2013 | Ho | ......................... | G02B 5/005 359/740 |
| 2015/0198779 A1* | 7/2015 | Cho | .................... | G02B 13/0035 359/601 |
| 2016/0043122 A1* | 2/2016 | Fujimori | ........... | H01L 27/14623 257/433 |
| 2018/0095204 A1* | 4/2018 | Lin | ......................... | G02B 5/22 |
| 2020/0007723 A1* | 1/2020 | Zhang | .................. | H04N 5/2254 |
| 2020/0049925 A1* | 2/2020 | Wei | ........................ | G02B 5/003 |

FOREIGN PATENT DOCUMENTS

CN 102062924 A 5/2011
JP 2014170182 A * 9/2014

* cited by examiner

*Primary Examiner* — Quan Pham
(74) *Attorney, Agent, or Firm* — ScienBiziP, P.C.

(57) ABSTRACT

A fixing ring of a certain design for a lens module substantially reduces stray light. The fixing ring defines a central axis, and comprises a base surface and a processing surface, formed from an edge of the base surface. A first angle $\theta_1$ exists between a first side cut surface and a surface perpendicular to the central axis, a distance L1 and the first angle $\theta_1$ satisfy formulas 0.015 mm<L1<0.025 mm and 20°<$\theta_1$<40°. The disclosure further provides a lens module and an electronic device comprising the fixing ring. An anti-dazzle film, matching with the fixing ring to completely absorb stray light, is included in the lens module.

17 Claims, 8 Drawing Sheets

FIXING RING, LENS MODULE, AND ELECTRONIC DEVICE INCLUDING THE SAME

FIELD

The subject matter herein generally relates to fixing rings of optical devices, and more particularly to a fixing ring which can completely absorb stray light, a lens module and an electronic device including the same.

BACKGROUND

A lens of a lens module is usually fixed on a lens base by ultraviolet-cured adhesive. However, if a thickness of the adhesive is too thin or a reflectivity is too high, stray light can enter. When a light beam passes directly through the lens close to an image sensor, an imaging quality of the lens module may be affected. Therefore a fixing ring is arranged on the lens close to the image sensor. In addition to stabilizing the structure of the lens module, the fixing ring can also block out most stray light. However, because the fixing ring is close to the image sensor, a part of light reflected by an inclined surface of the fixing ring can be imaged on the image sensor, and the other part of reflected light is obscured by a black frame of the image sensor, resulting in mushroom-shaped stray light.

BRIEF DESCRIPTION OF THE DRAWINGS

Implementations of the present technology will now be described, by way of embodiment, with reference to the attached figures.

DETAILED DESCRIPTION

Figure 1:
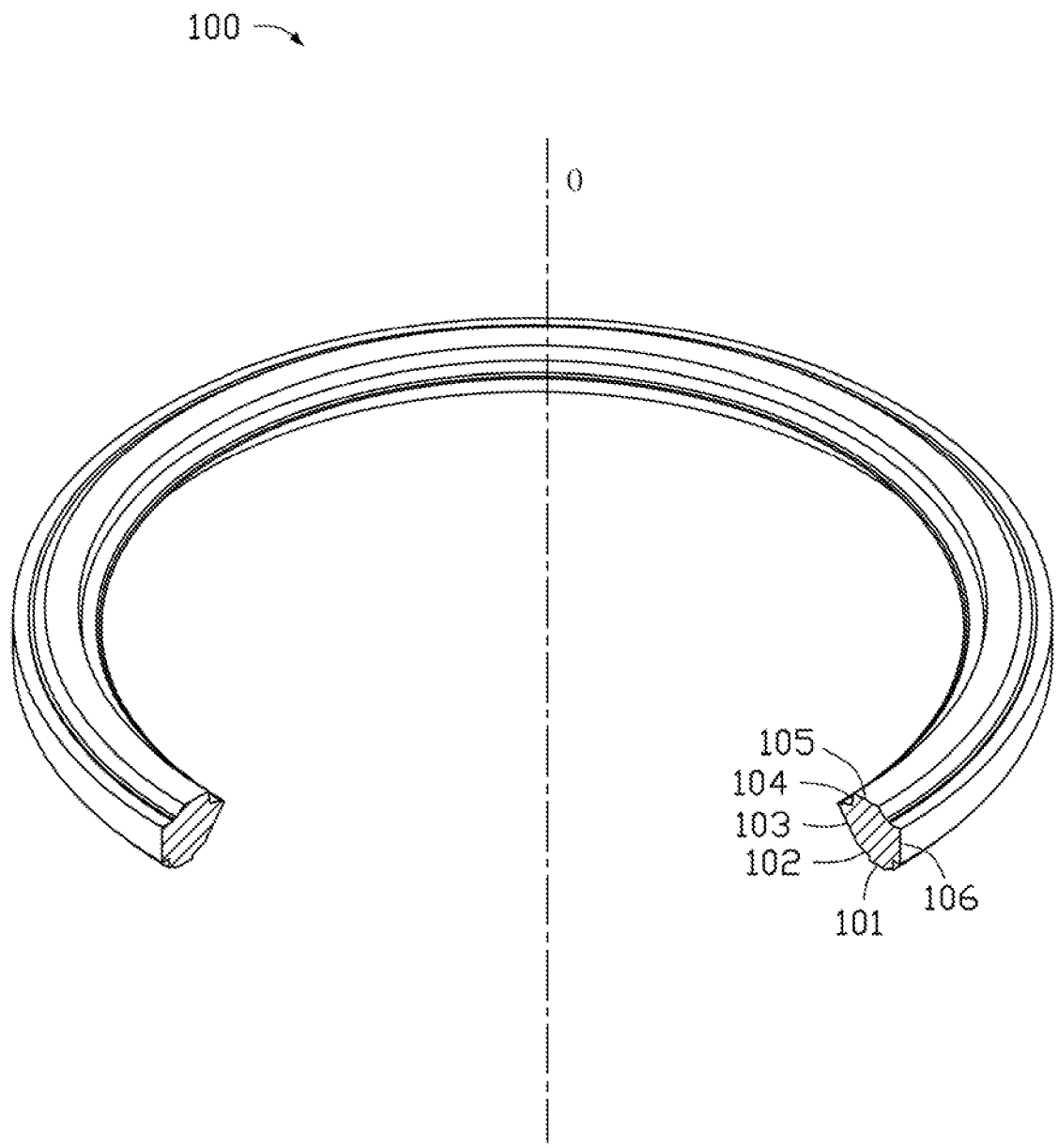
FIG. 1 is an isometric view of an embodiment of sectioned fixing ring.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

FIG. 1 illustrates a fixing ring 100. The fixing ring 100 defines an annular structure, and comprises a base surface 101, a processing surface 1011, a first side cut surface 102, a second side cut surface 103, a first connecting plane 104, a top surface 105, and a second connecting surface 106. The base surface 101, the processing surface 1011, the first side cut surface 102, the second side cut surface 103, the first connecting plane 104, the top surface 105, and the second connecting surface 106 are successively connected to form the fixing ring 100. All of the first side cut surface 102, the second side cut surface 103, and the first connecting surface 104 are located on the inner side of the fixing ring 100, the second connecting surface 106 is located on the outer side of the fixing ring 100. The fixing ring 100 defines a central axis O. The base surface 101 is perpendicular to the central axis of the fixing ring 100.

Figure 2:
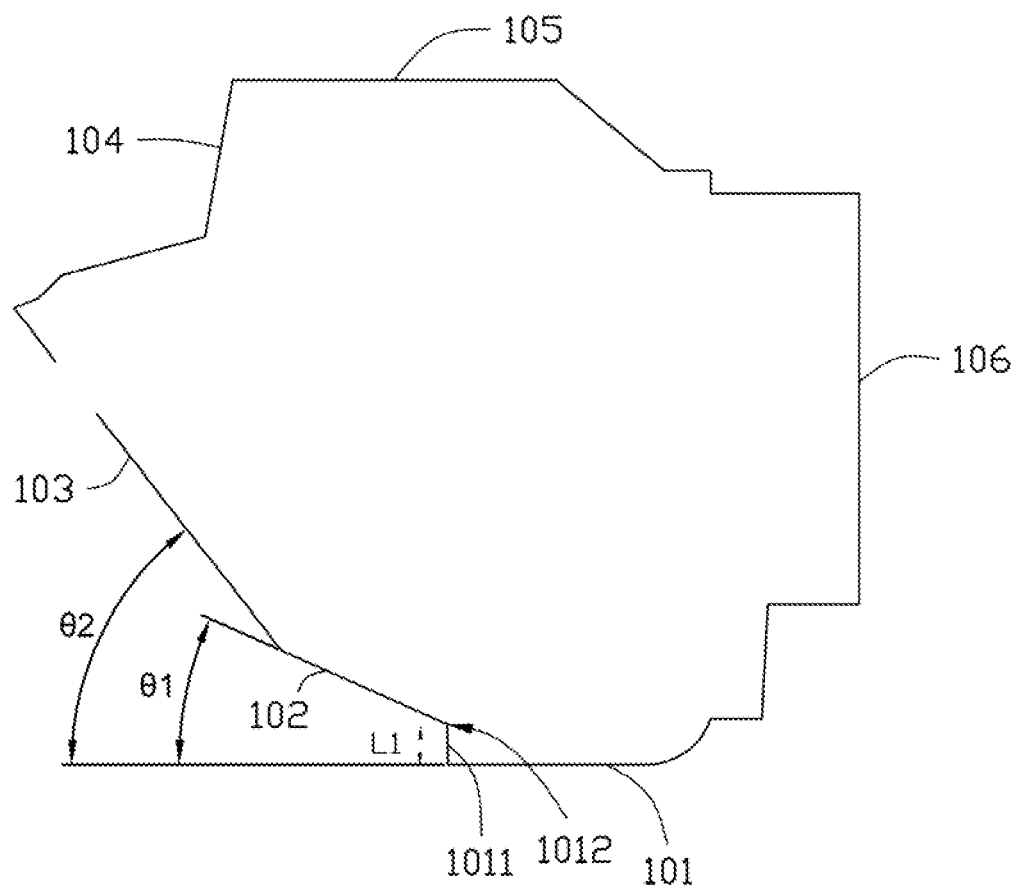
FIG. 2 is a schematic view of a sectioned surface of the fixing ring of FIG. 1.

FIG. 2 illustrates that the processing surface 1011 extends from an edge of the base surface 101 along a direction parallel to the central axis. The processing surface 1011 defines a distance L1, extending from the base surface 1011 along the direction parallel to the central axis, of 0.015-0.025 mm.

The first side cut surface 102 comprises bottom 1012, the first side cut surface 102 is coupled to the processing surface 1011 via the bottom bottom 1012. There is a first angle $\theta_1$ between the first side cut surface 102 and a surface perpendicular to the central axis. There is a second angle $\theta_2$ between the second side cut surface 103 and a surface perpendicular to the central axis. The second side cut surface 103 is coupled to an edge of the top surface 105 via the first connecting surface 104. The first connecting surface 104 can be a plane or a curved surface with an arbitrary shape. The top surface 105 is parallel to the base surface 101. The edge of the top surface 105 away from the first connecting surface 104 is coupled to the base surface 101 via the second connecting surface 106. The second connecting surface 106 can be a plane or a curved surface with an arbitrary shape.

As FIG. 2 illustrates, the first angle $\theta_1$ and the second angle $\theta_2$ satisfy the formulas $20°<\theta_1<40°$ and $\theta_1<\theta_2$. The distance that the processing surface 1011 extends from the base surface 101 along the direction parallel to the central axis is 0.018 mm, the first angle $\theta_1$ is 24°, and the second angle $\theta_2$ is 52°.

Figure 3:
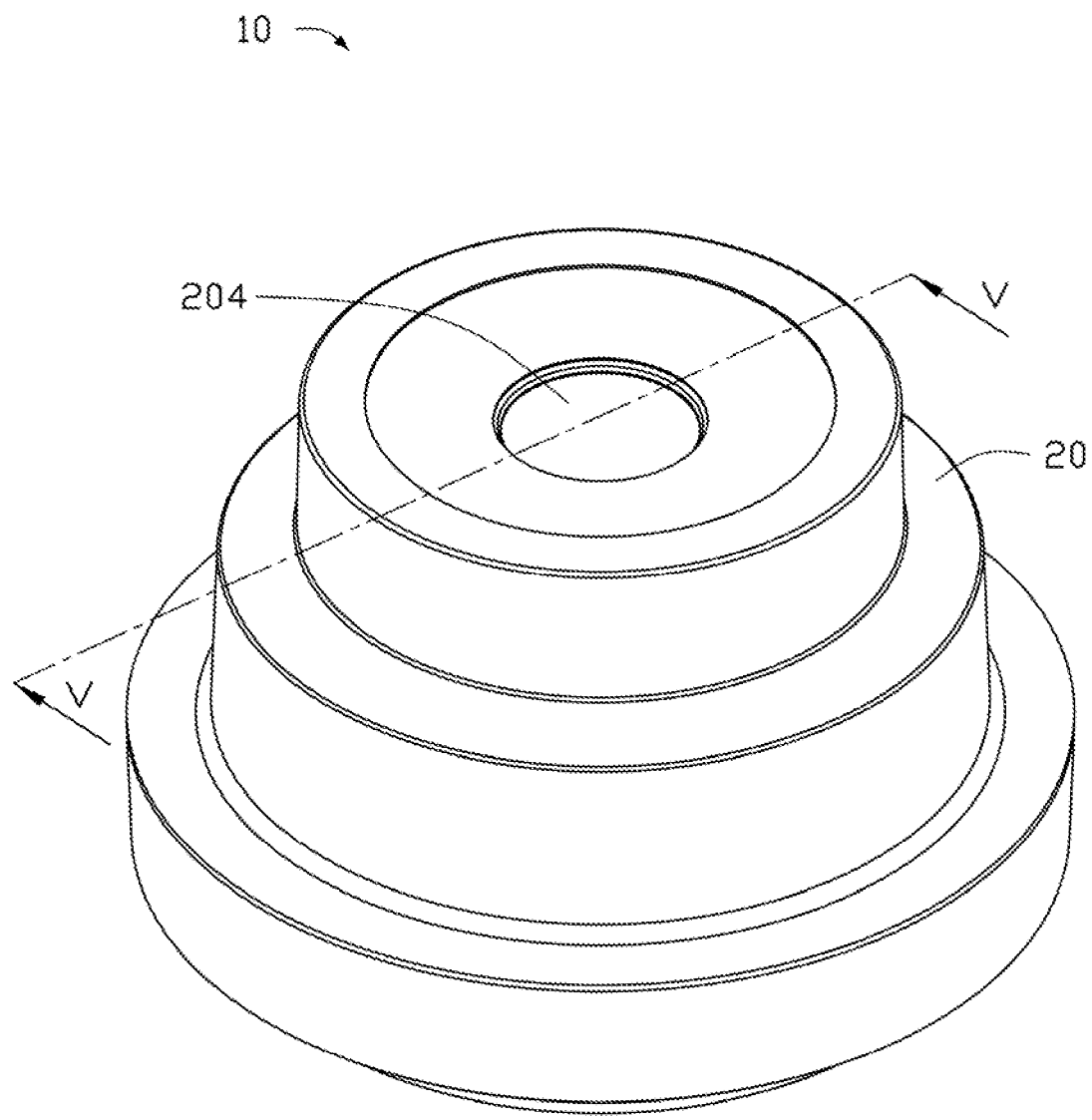
FIG. 3 is an isometric view of an embodiment of a lens module including the fixing ring of FIG. 1.
Figure 4:
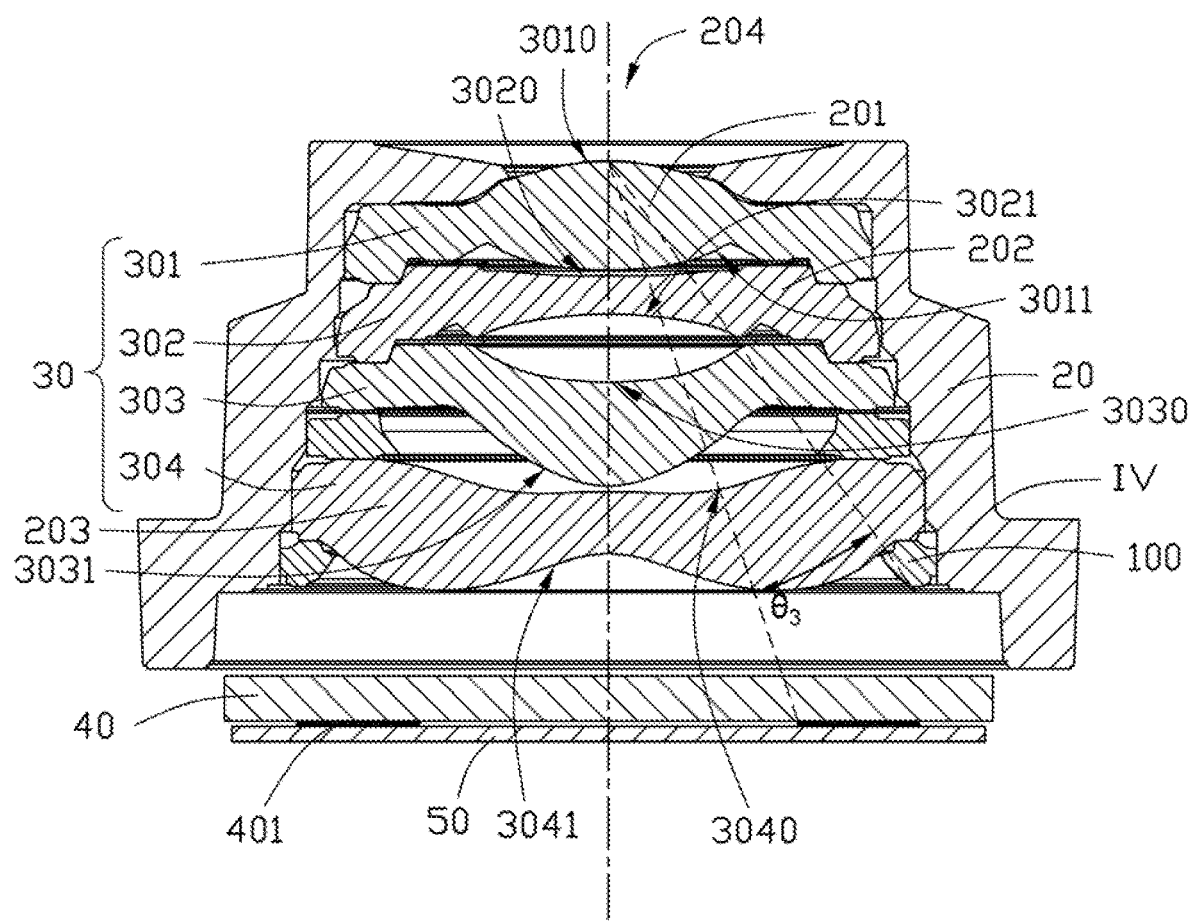
FIG. 4 is a cross-sectional view along line V-V of FIG. 3.

FIGS. 3 and 4 illustrate lens module 10 comprising, in such order from object side to image side, a lens assembly 30, the fixing ring 100, a filter 40, and an image sensor 50. The lens module 10 further comprises a lens barrel 20. The lens barrel 20 comprises, in such order from the object side to the image side, a first lens barrel portion 201, a second lens barrel portion 202, and a third lens barrel portion 203. Diameters of the first lens barrel portion 201, the second lens barrel portion 202, and the third lens barrel portion 203 are successively greater. The lens barrel 20 defines a light through hole 204.

The lens assembly 30 is mounted in the lens barrel 20, and comprises a first lens 301, a second lens 302, a third lens 303, and a fourth lens 304. The first lens 301 is mounted in the first lens barrel portion 201, the second lens 302 and the third lens 303 are both mounted in the second lens barrel portion 202, and the fourth lens 304 is mounted in the third lens barrel portion 203. The optical axes of the first lens 301, the second lens 302, the third lens 303, and the fourth lens 304 coincide with the central axis of the light through hole 204. The optical axes and the lens assembly 30 intersect at a lens origin P on the object side.

The filter 40 and the image sensor 50 are located outside of the lens barrel 20. The filter 40 is located adjacent to the side of the fourth lens 304 away from the third lens 303, and the filter is located between the fourth lens 304 and the image sensor 50.

The first lens 301 has a positive diopter, and comprises a first surface 3010 and a second surface 3011 opposite to the first surface 3010. The first surface 3010 is a convex surface protruding towards the object side. The second surface 3011 is a convex surface protruding towards the image side.

The second lens 302 has a negative diopter, and comprises a third surface 3020 and a fourth surface 3021 opposite to the third surface 3020. The third surface 3020 is a concave surface towards the object side. The fourth surface 3021 is a concave surface towards the image side.

The third lens 303 has a positive diopter, and comprises a fifth surface 3030 and a sixth surface 3031 opposite to the fifth surface 3030. The fifth surface 3030 is a concave surface towards the object side. The sixth surface 3030 is a convex surface protruding towards the image side.

The fourth lens 304 has a negative diopter, and comprises a seventh surface 3040 and an eighth surface 3041 opposite to the seventh surface 3040. The seventh surface 3040 is a concave surface towards the object side. The eighth surface 3041 is a concave surface towards the image side.

Figure 5:
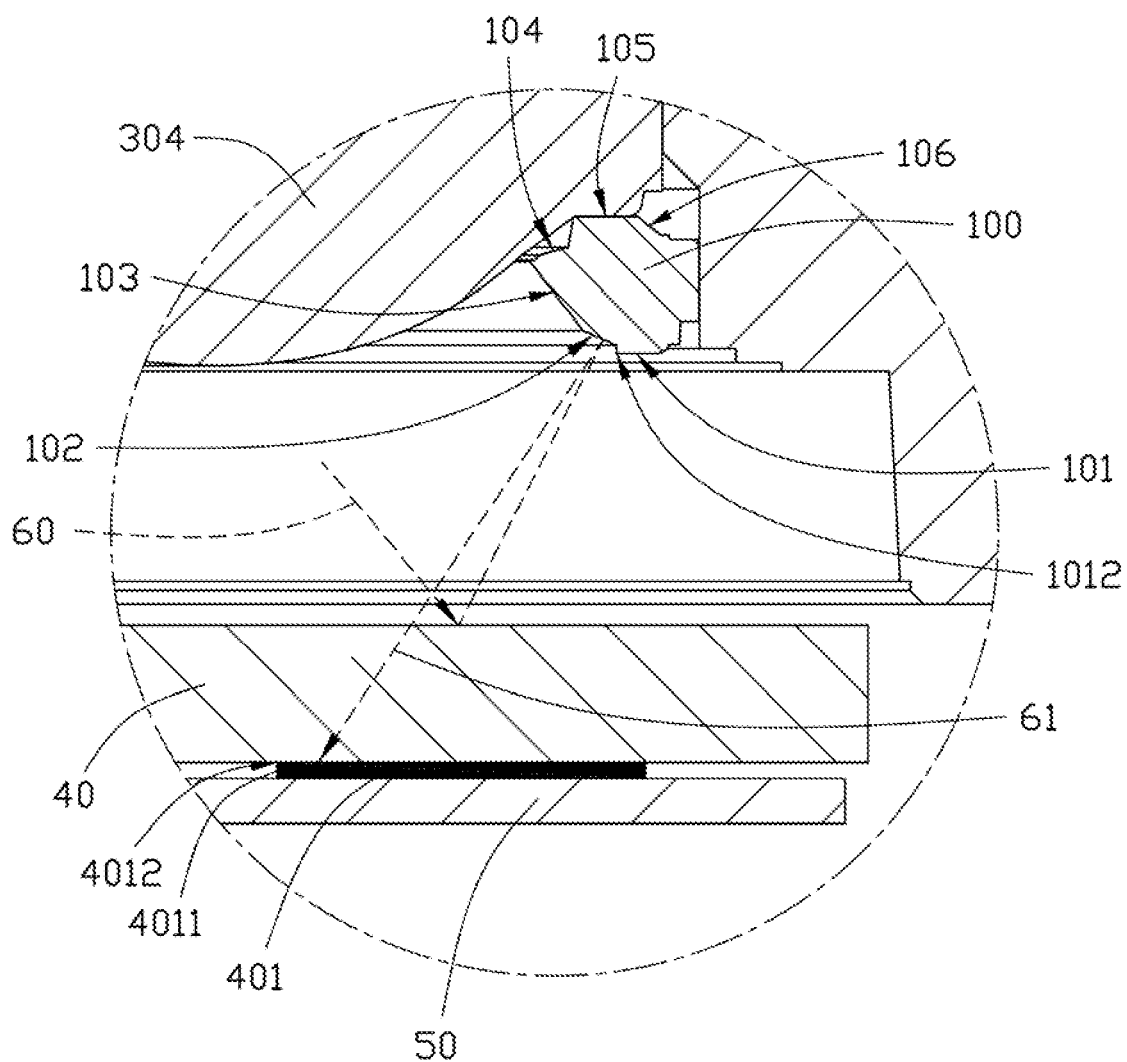
FIG. 5 is an enlarged view of circled area IV of FIG. 4.

The fixing ring 100 is fixed in the lens barrel 20, and is configured to support the eighth surface 3041 of the fourth lens 304. The axis of fixing ring 100 coincides with the central axis of the light through hole 204. FIG. 5 illustrates the top surface 105 of the fixing ring 100 contacting the eighth surface 3041 of the fourth lens 304. The base surface 101 of the fixing ring 101 is perpendicular to the central axis of the light through hole 204.

An anti-dazzle film 401 is arranged on the side of the image sensor 50 towards the filter 40. The anti-dazzle film 401 has an annular structure, and is configured to enclose a sensing area (not shown) of the image sensor 50. The anti-dazzle film 401 comprises a side surface 4011 towards the light through hole 204.

As FIG. 4 illustrates, a third angle $\theta_3$ between a line connecting a top 4012 of the side surface 4011 with the lens origin P and a line connecting the bottom 1012 of the first side cut surface 102 with the lens origin P satisfies the formula $\theta_3 > 9°$.

When incident light passes through the light through hole 204 to reach a surface of the filter 40, some of the incident light (hereinafter "incident light 60") is reflected to the first side cut surface 102 by the filter 40. There is a first angle $\theta_1$ between the first side cut surface 102 and a surface perpendicular to the central axis, and a second angle $\theta_2$ between the second side cut surface 103 and a surface perpendicular to the central axis.

By adjusting a relationship between the first angle $\theta_1$, the second angle $\theta_2$, and the third angle $\theta_3$, the incident light 60 from the lens assembly 30 is reflected towards the fixing ring 100 by the filter 40, and reflected light 61, reflected by the fixing ring 100, enters the anti-dazzle film 401.

The incident light 60 is completely absorbed by the anti-dazzle film 401 after being reflected by the first side cut surface 102. The mushroom-shaped stray light, caused by a part of the reflected light 61 being imaged on the sensing area of the image sensor 50 and another part of the reflected light 61 being absorbed by the anti-dazzle film 401, is substantially reduced.

Comparative Embodiment

Figure 6:
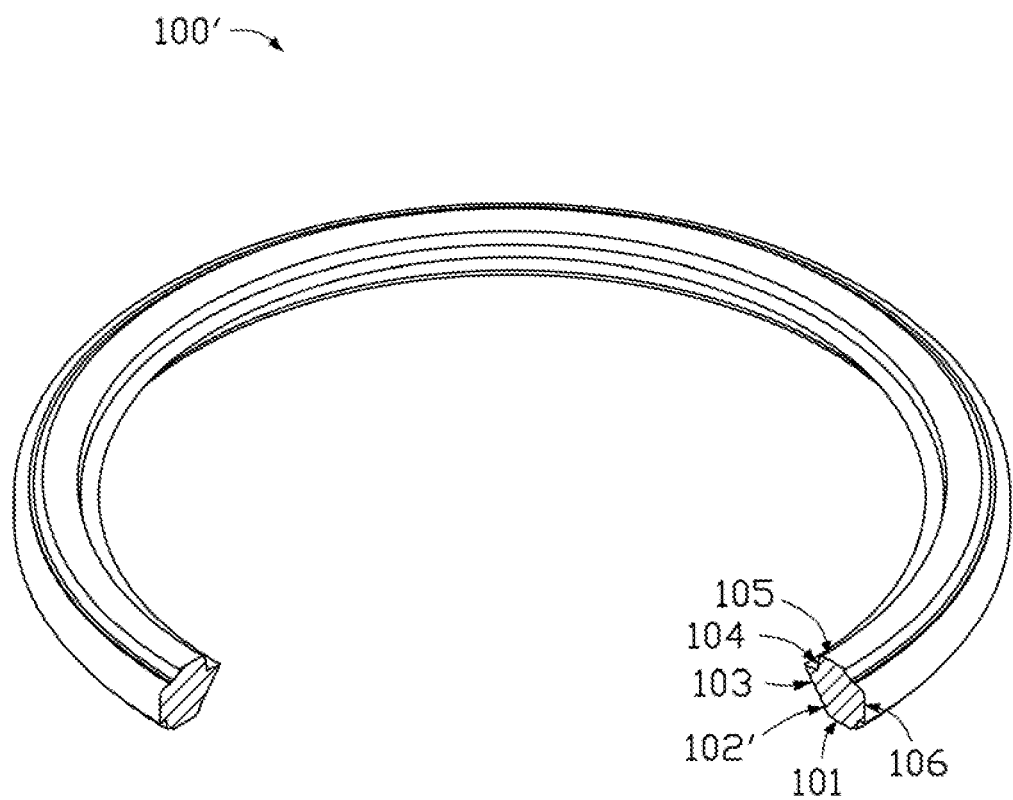
FIG. 6 is an isometric view of a comparative embodiment of a sectioned fixing ring.
Figure 7:
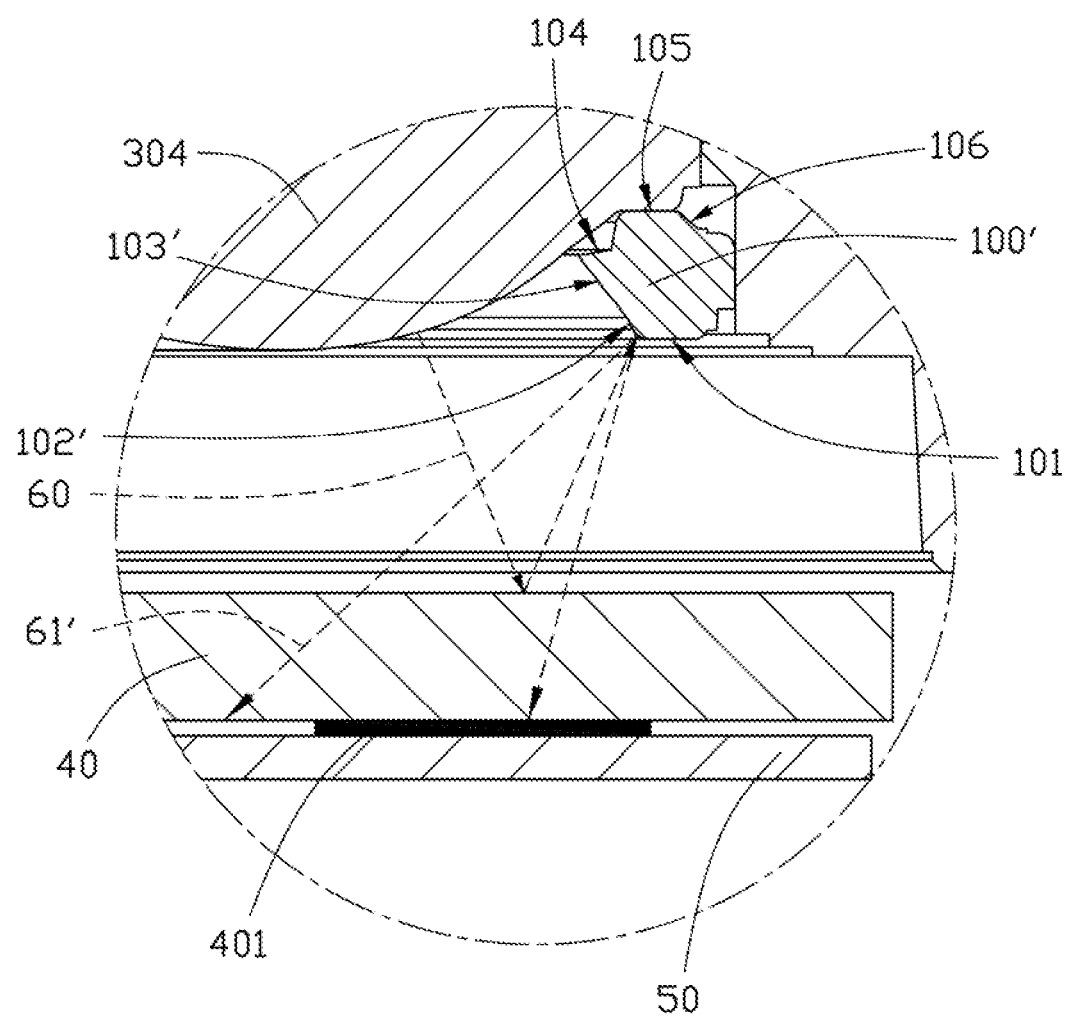
FIG. 7 is an enlarged and a cross-sectional view of a lens module including the fixing ring of FIG. 6.

FIGS. 6 and 7 illustrate a comparative embodiment of a fixing ring 100' and a lens module 10' comprising the fixing ring 100'. Unlike the fixing ring 100 of the above embodiment, the fixing ring 100' comprises a first reflecting surface 102' and a second reflecting surface 103'. The connecting positions of the first reflecting surface 102' are the same as those of the first side cut surface 102, however, the angle between the first reflecting surface 102' and the surface perpendicular to the central axis or the angle between the second reflecting surface 103' and the surface perpendicular to the central axis do not satisfy the formulas in the previous embodiment. The incident light 60 is reflected to the first reflecting surface 102' of the fixing ring 100' by the filter 40, and is then emitted at various angles after being reflected by the first reflecting surface 102'. Some of the resulting light is absorbed by the anti-dazzle film 401, but another part of such light is not absorbed by the anti-dazzle film 401 and results in the mushroom-shaped stray light on the sensing area.

The base surface 101 of the fixing ring 100 can be substantially perpendicular to the central axis O, for example, an angle $\theta_4$ (not shown) between the base surface 101 and the central axis O satisfies the formula $85° < \theta_4 < 95°$.

Figure 8:
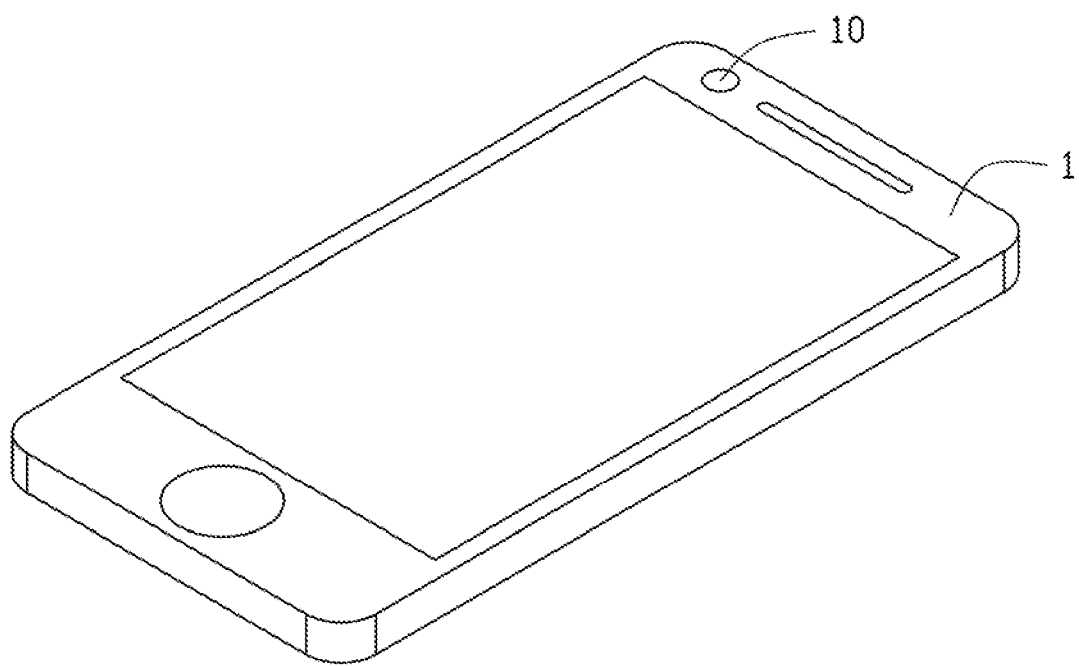
FIG. 8 is an isometric view of an embodiment of an electronic device including the lens module of FIG. 3.

FIG. 8 illustrates an electronic device 1 comprising the lens module 10. The electronic device 1 can be a cellphone, a laptop, a desktop computer, or a games machine, etc.

The cut surfaces of the fixing ring change the angles of reflection of the light, thus light can be completely absorbed by the anti-dazzle film of the image sensor, and stray light occurring during imaging is substantially reduced.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A fixing ring defining a central axis, and comprising
a base surface;
a processing surface, formed by extending a distance L1 along a direction parallel to the central axis from an edge of the base surface; and
a first side cut surface, comprising a bottom coupled to the base surface via the processing surface;
wherein a first angle θ1 is defined between the first side cut surface and a surface perpendicular to the central axis, the distance L1 and the first angle θ1 satisfy the formulas 0.015 mm<L1<0.025 mm, and 20°<θ1<40°;
the fixing ring further comprises a second side cut surface, a first connecting plane, a top surface, and a second connecting surface, wherein the base surface, the processing surface, the first side cut surface, the second side cut surface, the first connecting plane, the top surface, and the second connecting surface are successively connected to form the fixing ring, the second side cut surface and the first connecting plane are located on the inner side of the fixing ring, the second connecting surface is located on the outer side of the fixing ring;

a second angle θ2 is defined between the second side cut surface and the base surface, the first angle θ1 and the second angle θ2 satisfy the formulas θ1<θ2;

the first angle θ1 is 24°, the second angle θ2 is 52°, and the distance L1 is 0.018 mm.

2. The fixing ring of claim 1, wherein the base surface is perpendicular to the central axis of the fixing ring, the top surface is parallel to the base surface.

3. A lens module comprising:
a lens barrel;
a lens assembly received in the lens barrel;
a filter located outside of the lens barrel;
an image senor located adjacent to a side of the filter away from the lens barrel;
an anti-dazzle film arranged on a side of the image sensor towards the filter, and configured for enclosing a sensing area; and
a fixing ring fixed in the lens barrel to support the lens assembly and located between the lens assembly and the filter, the fixing ring defining a central axis, and comprising
a base surface;
a processing surface, formed by extending a distance L1 along a direction parallel to the central axis from an edge of the base surface;
a first side cut surface, comprising a bottom coupled to the base surface via the processing surface; and
a second side cut surface coupled to the first side cut surface,
wherein a first angle θ1 is defined between the first side cut surface and a surface perpendicular to the central axis, and a second angle θ2 is defined between the second side cut surface and a surface perpendicular to the central axis, the first angle θ1, the second angle θ2, and the distance L1 satisfy predetermined formulas to make incident light form from the lens assembly be reflected to the fixing ring by the filter, and to make reflected light reflected by the fixing ring enter the anti-dazzle film.

4. The lens module of claim 3, wherein the lens assembly, the filter, and the image sensor are arranged in such order from object side to image side, the lens assembly defines a virtual optical axis coinciding with the central axis, the optical axis and the lens assembly intersect at a lens origin P on the object side.

5. The lens module of claim 4, wherein the anti-dazzle film comprises a side surface towards the lens assembly, an angle θ3 is defined between a line connecting a top of the side surface with the lens origin P and a line connecting a bottom of the first side cut surface with the lens origin P, the angle θ3 satisfies the formula θ3>9°.

6. The lens module of claim 5, wherein the fixing ring further comprises a first connecting plane, a top surface, and a second connecting surface, wherein the base surface, the processing surface, the first side cut surface, the second side cut surface, the first connecting plane, the top surface, and the second connecting surface are successively connected to form the fixing ring, the second side cut surface and the first connecting plane are located on the inner side of the fixing ring, the second connecting surface is located on the outer side of the fixing ring.

7. The lens module of claim 4, wherein the lens barrel comprises, in such order from the object side to the image side, a first lens barrel portion, a second lens barrel portion, and a third lens barrel portion.

8. The lens module of claim 7, wherein diameters of the first lens barrel portion, the second lens barrel portion, and the third lens barrel portion are successively greater.

9. The lens module of claim 7, wherein the lens assembly comprises a first lens, a second lens, a third lens, and a fourth lens, the first lens is mounted in the first lens barrel portion, the second lens and the third lens are both mounted in the second lens barrel portion, the fourth lens is mounted in the third lens barrel portion.

10. The lens module of claim 9, wherein the first lens has a positive diopter, the second lens has a negative diopter, the third lens has a positive diopter, and the fourth lens has a negative diopter.

11. The lens module of claim 3, wherein the first angle θ1, the second angle θ2, and the distance L1 satisfy the formulas 0.015 mm<L1<0.025 mm, 20°<θ1<40°, and θ1<θ2.

12. The lens module of claim 11, wherein the first angle θ1 is 24°, the second angle θ2 is 52°, and the distance L1 is 0.018 mm.

13. An electronic device comprising a lens module, the lens module comprising:
a lens barrel;
a lens assembly received in the lens barrel;
a filter located outside of the lens barrel;
an image senor located adjacent to a side of the filter away from the lens barrel;
an anti-dazzle film arranged on a side of the image sensor towards the filter, and configured for enclosing a sensing area; and
a fixing ring fixed in the lens barrel to support the lens assembly and located between the lens assembly and the filter, the fixing ring defining a central axis, and comprising
a base surface;
a processing surface, formed by extending a distance L1 along a direction parallel to the central axis from an edge of the base surface;
a first side cut surface, comprising a bottom coupled to the base surface via the processing surface; and
a second side cut surface coupled to the first side cut surface,
wherein a first angle θ1 is defined between the first side cut surface and a surface perpendicular to the central axis, and a second angle θ2 is defined between the second side cut surface and a surface perpendicular to the central axis, the first angle θ1, the second angle θ$_2$, and the distance L1 satisfy predetermined formulas to make incident light form from the lens assembly be reflected to the fixing ring by the filter, and to make reflected light reflected by the fixing ring enter the anti-dazzle film.

14. The electronic device of claim 13, wherein the lens assembly, the filter, and the image sensor are arranged in such order from object side to image side, the lens assembly defines a virtual optical axis coinciding with the central axis, the optical axis and the lens assembly intersect at a lens origin P on the side near the object.

15. The electronic device of claim 14, wherein the anti-dazzle film comprises a side surface towards the lens assembly, an angle θ3 is defined between a line connecting a top of the side surface with the lens origin P and a line connecting a bottom of the first side cut surface with the lens origin P, the angle $\theta 3$ satisfies the formula $\theta 3 > 9°$.

16. The electronic device of claim 13, wherein the first angle $\theta 1$, the second angle $\theta 2$, and the distance L1 satisfy the formulas 0.015 mm<L1<0.025 mm, 20°<$\theta 1$<40°, and $\theta 1$<$\theta 2$.

17. The electronic device of claim 16, wherein the first angle $\theta 1$ is 24°, the second angle $\theta 2$ is 52°, and the distance L1 is 0.018 mm.

* * * * *